United States Patent [19]

Lesche

[11] 4,225,936
[45] Sep. 30, 1980

[54] FUNCTION GENERATOR WITH STORAGE MATRIX

[75] Inventor: Wolfgang Lesche, Berlin, Fed. Rep. of Germany

[73] Assignee: Siemens Aktiengesellschaft, Munich, Fed. Rep. of Germany

[21] Appl. No.: 932,491

[22] Filed: Aug. 10, 1978

[30] Foreign Application Priority Data

Aug. 23, 1977 [DE] Fed. Rep. of Germany ....... 2738352

[51] Int. Cl.² .................................................. G06F 1/02
[52] U.S. Cl. ...................................... 364/718; 364/715
[58] Field of Search ........................ 364/718, 715, 602

[56] References Cited

U.S. PATENT DOCUMENTS

| 3,898,448 | 8/1975 | Clark | 364/718 |
| 3,952,189 | 4/1976 | Fabricius | 364/718 |
| 3,962,573 | 6/1976 | Staley | 364/718 |
| 4,024,385 | 5/1977 | Richards | 364/718 |
| 4,044,243 | 8/1977 | Cooper et al. | 364/715 |

Primary Examiner—David H. Malzahn
Attorney, Agent, or Firm—Kenyon & Kenyon

[57] ABSTRACT

A function generator comprising an oscillator, an address counter, a storage matrix with $2^n$ addresses at m bits, and a digital to analog converter in which the storage matrix which is organized only according to the change which is maximally obtained between adjacent addresses of the function to be produced with integrating means coupled between the storage matrix and the output of the function generator for generating, for instance, nonlinear periodic processes or the nonlinear representation of electrical analog variables.

9 Claims, 40 Drawing Figures

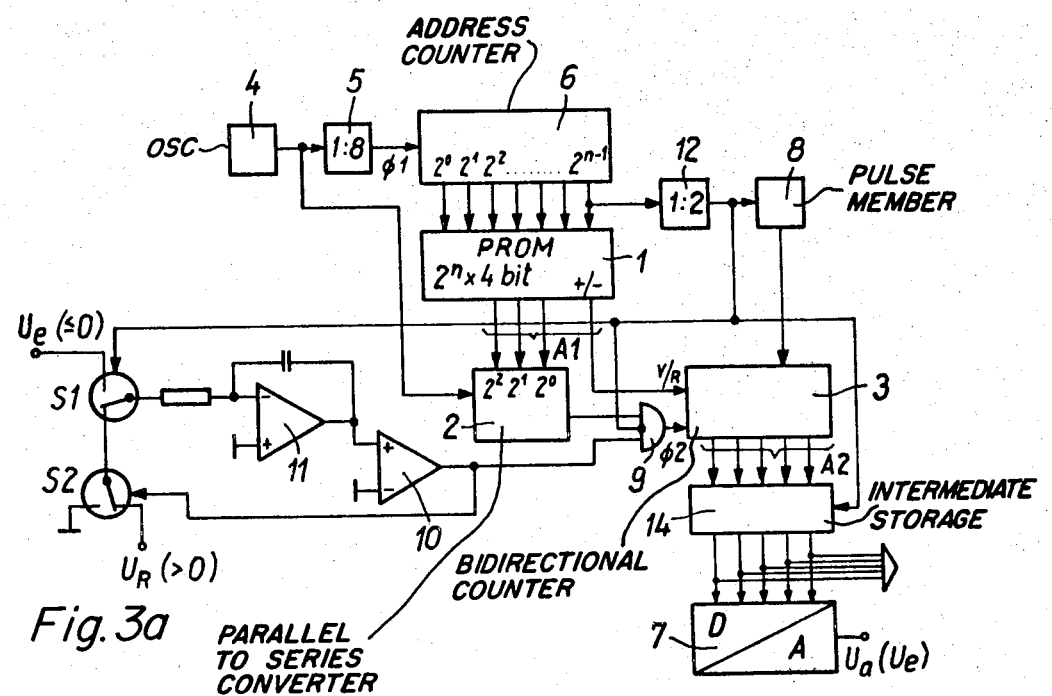
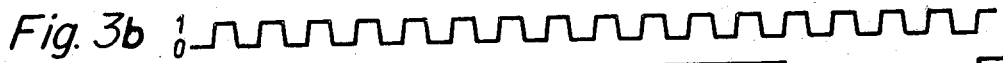
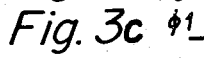
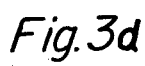
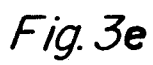
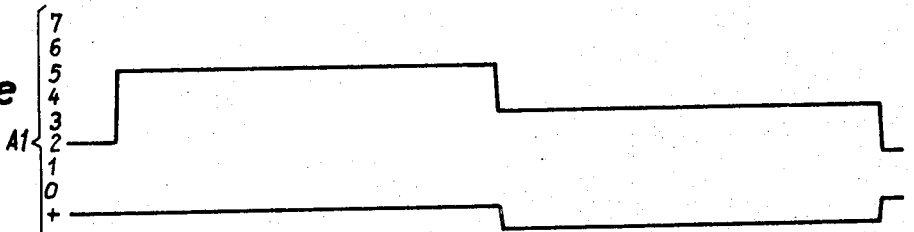
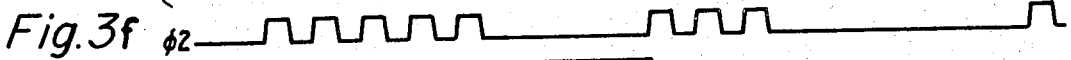

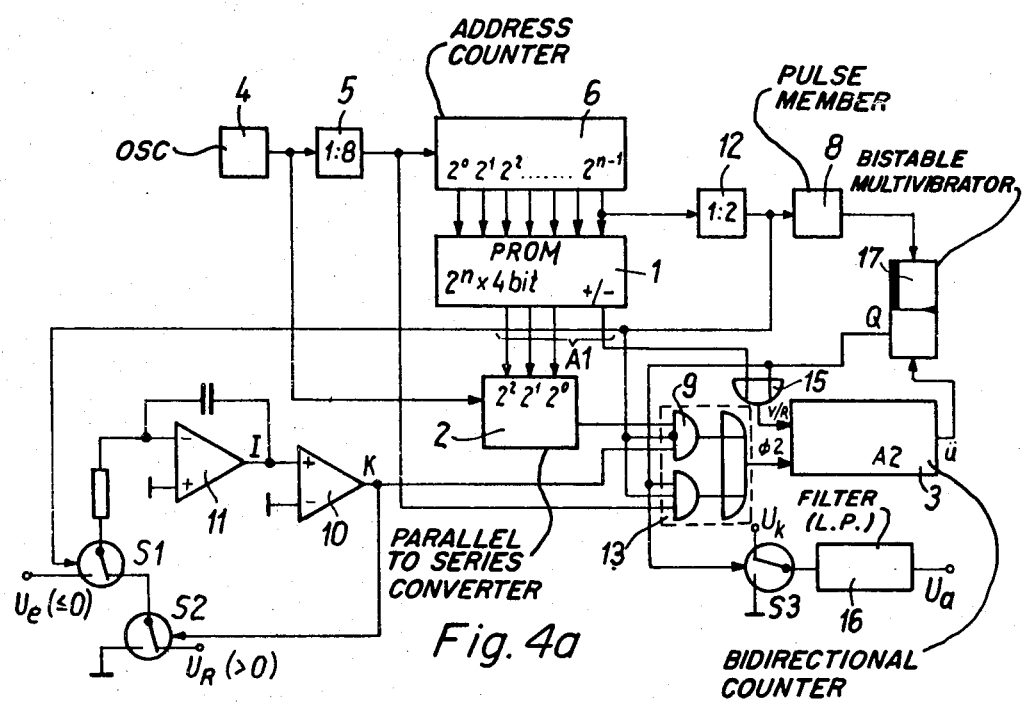
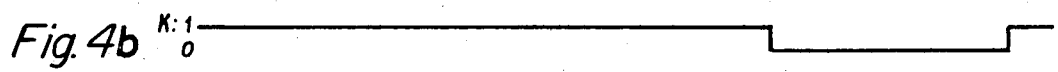
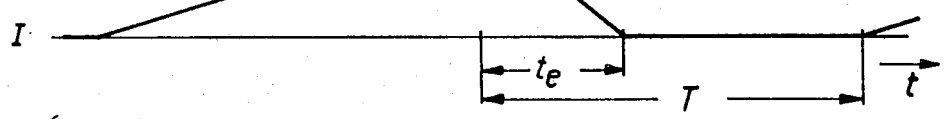
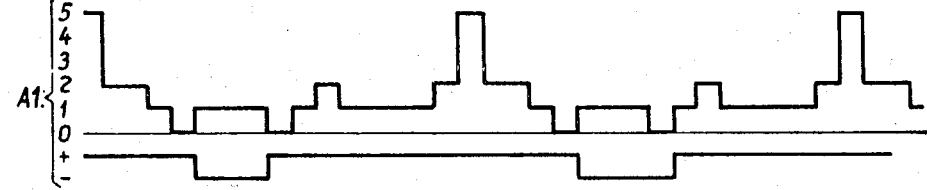
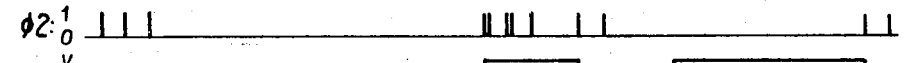
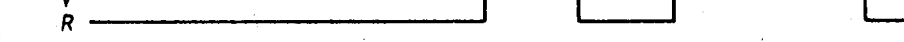
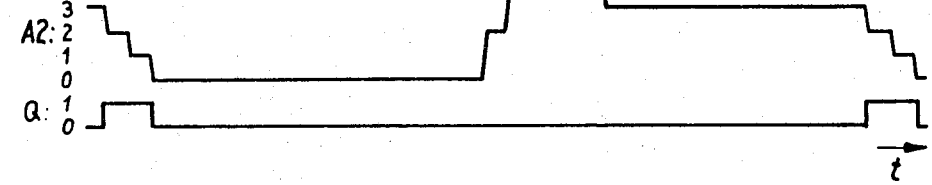

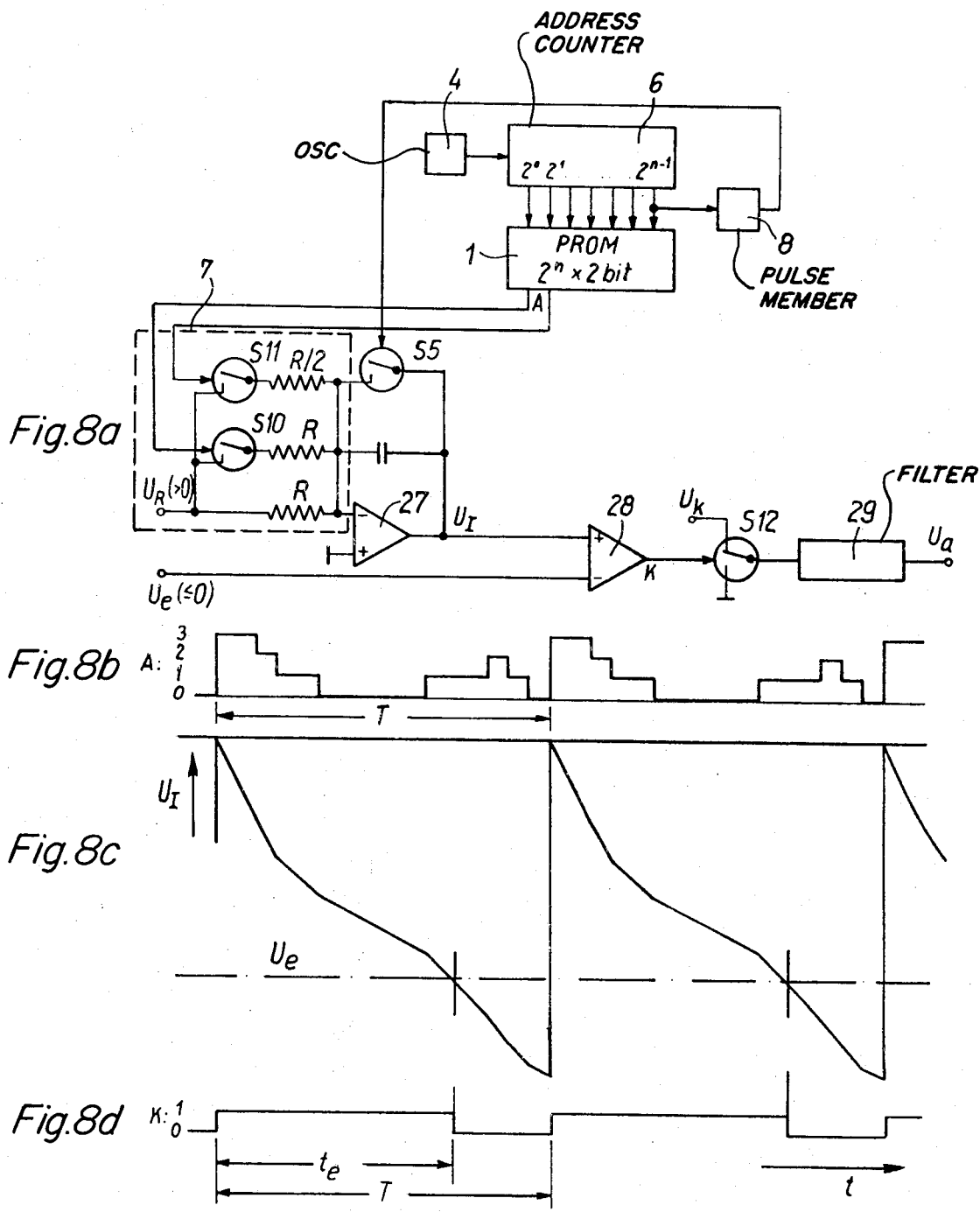

FUNCTION GENERATOR WITH STORAGE MATRIX

BACKGROUND OF THE INVENTION

This invention relates to digital function generators in general and more particularly to a function generator with reduced storage requirements.

Function generators including an oscillator, an address counter, a storage matrix with $2^n$ addresses at m bits as well as a digital-to-analog converter are known. Such function generators for generating predominantly slow, nonlinear periodic events have been used, for instance, for the faithful simulation of electrocardiograms. In this function generator, the time of a period of the signal to be simulated as well as the amplitude range of the signal are quantized into 256 steps. For each of the 256 points in time (addresses) of the period, the corresponding amplitude values can be stored in a PROM. In this specific case, the memory must have 256 addresses at 8 bits each. These 256 addresses of the memory are addressed sequentially via a frequency-adjustable reference generator (oscillator) as well as an address counter. The digitally stored amplitude values are converted into corresponding analog signals via a digital-to-analog converter. A filter connected to the output may be used for additionally smoothing the signal. If it is desired to increase the resolution of a signal simulated in this manner, for instance, to 0.1%, then a storage matrix of $1024 \times 10$ bits is required. The presently available storage elements, however, consist only of $1024 \times 8$ bits, so that two such storage elements would be required for this specific purpose.

SUMMARY OF THE INVENTION

It is an object of the present invention to reduce the amount of storage required and thereby, the manufacturing costs, without degrading the resolution in a function generator of the type mentioned at the outset. According to the present invention, this problem is solved by organizing the storage matrix according to the maximum change of the arbitrarily specifiable function to be produced between adjacent addresses, and by connecting an integrating member between the storage matrix and the output of the function generator. Contrary to the state of the art, only the changes of the function to be produced are stored address by address in the storage matrix. The absolute value of the function is subsequently obtained through integration of these increments, beginning with a fixed starting value. The considerable savings of storage space are demonstrated most clearly in a comparison with the example given above, for which a storage matrix of $1024 \times 10$ bits was required. For the same resolution, a storage matrix of only a $1024 \times 3$ bits is required in a function generator according to the present invention. A commercially available storage element of $1024 \times 8$ bits would thus not even be utilized fully, but in any event, one such storage element would be saved.

In one embodiment, the integrating member comprises a simple analog integrator which follows the digital-to-analog converter. With such an arrangement, only monotonically rising or monotonically falling functions can initially be generated, since the output signal of the digital-to-analog converter contains no information regarding the sign of the stored quantity. A further switching member, arranged between the digital-to-analog converter and the integrator, which determines the sign, likewise addressed via the storage matrix is therefore required. An advantageous embodiment, however, comprises coupling the integrating member between the storage matrix and the digital-to-analog converter and having it comprise a bidirectional counter which is preceded by a parallel-to-series converter which is driven with a frequency higher by at least the factor $2m-1$ than the address counter. In that case, the integration is performed ahead of the digital-to-analog converter. To this end, the stored increment values must first be converted, at least if the storage capacity per address is greater than 1 bit, via a parallel-to-series converter, into individual pulses which are subsequently added by the bidirectional counter. Since the parallel-to-series converter may have to generate several pulses per address, it must be driven at a frequency which is higher by the factor of the maximum number of pulses to be generated per address than the frequency of the address counter. One additional bit of storage content per address permits simultaneously storing the sign of the information, which can be fed directly to the bidirectional counter. Thus, it is possible to generate monotonically rising and falling functions with this circuit. The period of the function, for instance, can be changed by changing the frequency of the oscillator.

In circuit design, not only the problem of generating periodic functions arises, it is equally important to map individual values of electrical analog measurement quantities (voltages) reproducibly in accordance with a nonlinear function. Such problems occur, for instance, in linearizing nonlinear functions such as the thermo voltage as a function of the temperature or the resistance change of strain gages as a function of a mechanical stress.

Starting out from the state of the art described at the outset, one can visualize a solution to this problem, in which the oscillator and the address counter ahead of the storage matrix are replaced by a known analog-to-digital converter. This analog-to-digital converter assigns, so to speak, an address in the memory to each value of the measurement variable (input voltage). The corresponding value of the function stored there is reconverted on the output side into an analog voltage via a digital-to-analog converter. As with the known function generator for generating a periodic function, very much storage space would also be required with this conceivable solution.

In contrast thereto, it is proposed in another embodiment of the present invention that a control member, by means of which the stored data in the storage matrix are coupled to the integrating member only up to an address depending on an external measurement variable, is associated with the integrating member. For each value of the measurement variable, e.g., a given thermo voltage, an address in the storage matrix, up to which the integration is performed, is assigned by the control member. The integration value obtained at this point corresponds to the absolute value of the function for the given value of the measurement variable, i.e., of a temperature in the example above. A bidirectional counter can again be used as the integrator, the output of which is fed, for instance, to intermediate storage, e.g., a latch, from which, at the end of a period, the absolute value of the function can be taken directly digitally or in analog form via the digital-to-analog converter.

Since in the nonlinear mapping of individual values of electrical analog measurement variables, only the final value of the integrator reached matters and not the intermediate values, the function generator according to the present invention can be simplified further by providing that the integrating member and the digital-to-analog converter following it consist of a lowpass filter, to the input of which a voltage source is connected via a switch which is operated by the storage matrix together with the control member. The integration and the digital-to-analog conversion are reduced here to forming the quotient of the time during which the voltage source is connected to the filter, to the total time of a period.

This becomes particularly simple for a function only rising or falling monotonically with not too steep a slope, for the reproduction of which the increment values 0 and 1 are sufficient. In this special case, the storage matrix need be organized with only one bit per address. The integration is then reduced to forming the ratio of the individual pulses. Expressed differently, one can also say that the arithmetic mean of the time during which voltage is applied to the filter, relative to the time of a period is formed. This arithmetic mean is always between 0 and 1, multiplied by the magnitude of the auxiliary voltage.

In a further embodiment of the invention, the control member comprise a comparator, to the one input of which a voltage $U_e$ corresponding to the measurement variable is connected and to the other input of which, via an integrator, a constant reference voltage $U_R$ is connected. The output of the comparator as well as the output of the storage matrix are coupled as inputs to AND gate. The control member operates according to the single-slope method known in analog-to-digital converters. In this method, the input voltage $R_e$ is converted into a time. A count of the address counter, given by the oscillator frequency, and thereby, a given address in the storage matrix corresponding to this time. Integration takes place up to this address. In a control member according to the single-slope method, the danger may exist, in some circumstances, that due to drift phenomena of the integrator or the comparator, errors in the conversion of the measurement variable into time will occur over the course of time. To avoid such errors, an embodiment is disclosed in which the control member consist of a comparator, the one input of which is at constant potential and the other input of which is connected via an integrator to a voltage $U_e$ corresponding to the measurement variable during a first run-through (or sweep) of the address counter, and during a second counter run, via the same integrator, a constant reference voltage $U_R$ with a polarity opposite that of the voltage $U_e$ is connected until the comparator is balanced. The output of the comparator as well as the output of the storage matrix are connected to respective inputs of an AND gate and the last digit of the address counter is connected, via a frequency-halving circuit, to a further input of this AND gate. The principle of such a control member is known in the analog-to-digital converter art as the dual-slope method. The input voltage is integrated over one sweep of the address counter, i.e., a constant time. During a second sweep, a reference voltage of opposite polarity is integrated until the integrator is returned to zero. The time interval to reach zero depends on the integration value reached in the previous run and is a measure of the input voltage; the latter is thereby again converted into a time, which corresponds to an address in the storage matrix. Since the time corresponding to the input voltate is ascertained only in the second run of the address counter and the output values of the storage matrix must be passed to the integrating member only during this time, a frequency-halving circuit is coupled to the last digit of the address counter, which enables the stored values to be coupled to the integrating member only during every second run.

A further advantageous embodiment for fixing the integration limits uses a control member comprising a comparator, to the one input of which a voltage $U_e$ corresponding to the measurement variable is connected and to the other input of which are connected, via the digital-to-analog converter, the outputs of a network of n digital double-throw switches, where the one input of each digital double-throw switch is connected to one of the n outputs of the address counter and the other input of each digital double-throw switch is connected to one of the n outputs of the bidirectional counter. The output of the comparator, the output of the parallel-to-series converter and, via a frequency-halving circuit, the last digit of the address counter are connected to the inputs of the AND gate. Further, a switch which is also addressed by the last digit of the address counter is provided to couple the output of the digital-to-analog converter to the final circuit output via intermediate storage, i.e., a sample and hold circuit. Contrary to the previous control members, in which the conversion of the input voltage into a time was performed on the input side by means of a constant reference voltage, here the conversion of the input voltage into the integration time is performed, so to speak, in a feedback branch. The digital double-throw switch, provided n times, insures, during a first sweep of the address counter, that the instantaneous counter content is continuously converted via a digital-to-analog converter into an analog voltage which is compared in a comparator with the input voltage. When the comparator is balanced, the counter content and therefore, the address, which corresponds to the input voltage, is reached and the integration is interrupted. At the end of this address counter sweep or in a further sweep, the n digital double-throw switches are switched so that the content of the bidirectional counter, in this case, therefore, of the integrator, is converted via the digital-to-analog converter into an analog output signal which corresponds to the desired absolute value of the function. Due to this direct conversion of the digital address counter content into an analog voltage, a variation of the oscillator frequency will not have a disturbing influence on the measurement result in a control element of this type.

Another advantageous further embodiment of the function generator according to the invention is obtained where the integrating member consists of an analog integrator which follows the digital-to-analog converter and the output of which is connected to one input of a comparator, to the other input of which a voltage $U_e$ corresponding to the measurement variable is applied. A lowpass filter is provided, to which a voltage source is connected via a switch addressed by the comparator. At the output of the integrator is then obtained, periodically in time, first, the absolute value of the function, the increments of which are stored in the storage matrix. Through comparison of this value of the function with an input voltage $U_e$ at the comparator, a time from the beginning of the period to the point when the comparator is balanced is determined, which time depends on the function. In the following filter, this time is put in relation to the total time of the period, i.e., a sweep of the address counter. At the output of the filter, a signal is thereby obtained which corresponds exactly to the inverse function at the point of the input voltage. This function generator, which in the illustrated circuit is suited only for monotonically rising or monotonically falling functions, is suitable particularly for linearizing thermo voltage curves. This extension of the function generator of the stored data is performed via digital-to-analog conversion and subsequent analog integration; any other way of generating the absolute value of the function is equally suitable. The specific solution given here, however, is distinguished particularly by few and, in addition, simple circuit components. In spite of the low cost, great accuracy can be achieved with such a circuit.

BRIEF DESCRIPTION OF THE DRAWINGS

FIGS. 3a to 7e show block diagrams of different embodiments of the function generator, along with wave forms, specifically for nonlinear mapping of electrical analog variables.

FIGS. 8a–d show the block diagram of a function generator for nonlinear mapping of electrical analog variables corresponding to the inverse function.

DETAILED DESCRIPTION OF THE INVENTION

Figure 1A:
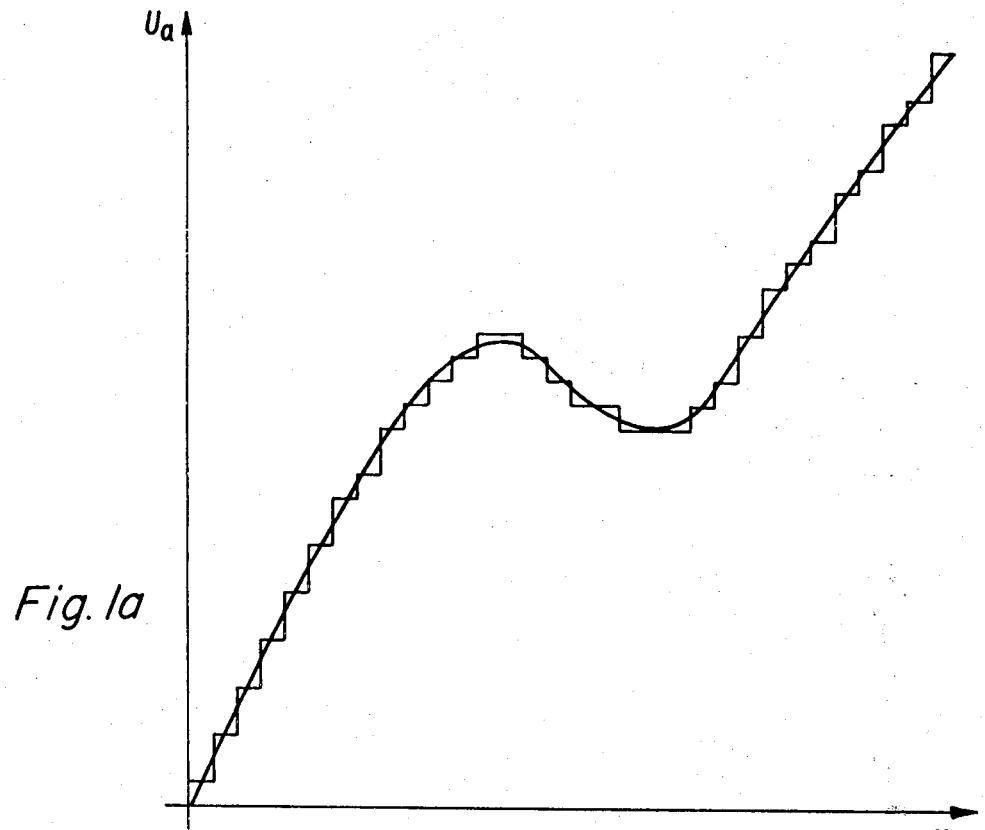
FIGS. 1a and 1b show the generation of the approximation of a function by absolute values and increments.

For a better understanding of the principle of the solution according to the invention, the approximation of a function $U_a$ by digital absolute values or digital increments $\Delta U_a$ is shown in FIG. 1. This construction is suited for the nonlinear mapping of electrical analog variables. If, on the other hand, the abscissa is represented by the time axis, this can also describe part of a periodically repeated function. To approximate this function by digital absolute values, both axes have been subdivided into steps of equal size; one step is to correspond to one bit. The step curve drawn shows the approximation that was made. In a state of the art function generator, the number of steps to a desired value on the abscissa represents the address for the memory, and the number of steps to the corresponding ordinate value then represents the value of the function to be stored at this address. It is already evident from this that a square storage matrix is required, unless one wants to make a limitation regarding the kind of functions, with as many addresses as setting possibilities within each address. This increases the storage required quadratically with a finer subdivision, i.e., with smaller steps.

Figure 1B:
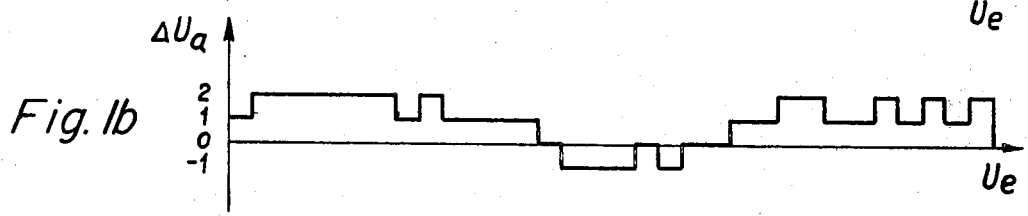

In FIG. 1b, the digital increments $\Delta U_a$, i.e., the digital changes of the function $U_a$ from address to address, i.e., from step to step, are plotted versus the same abscissa. As will be seen, the increments vary only very little over the entire curve; in this specific case, between $-1$ and $+2$. For storing this information, very much less storage space per address is required, which reduces the total storage capacity greatly. The absolute value of the function $U_a$ for a given abscissa value $U_e$ is then obtained by summing all the increments $\Delta U_a$ from a given starting value, for instance, zero, up to the address corresponding to the abscissa value $U_e$.

Figure 2A:
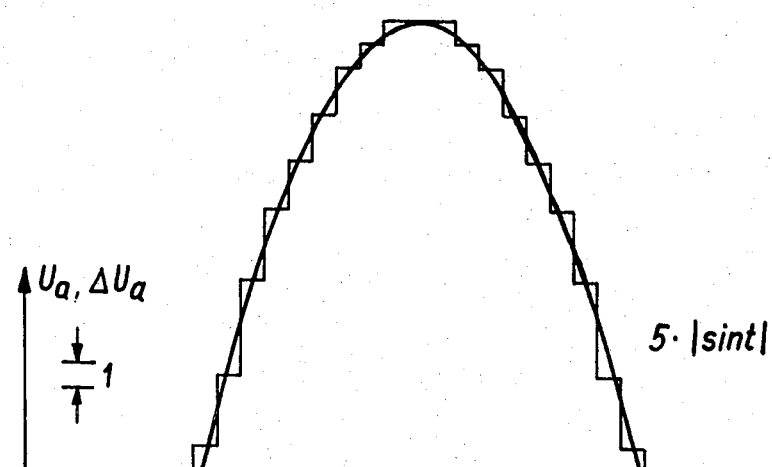
FIGS. 2a and 2b show the block diagram of a function generator and at the same time again the generation of the absolute values and the increments of a periodic function generated thereby, through the example of a rectified sine wave.

FIG. 2a shows as an example of a periodic function the construction of $U_a = 5 \times |\sin t|$, plotted versus t. Shown again is the function, its approximation by digital absolute values as well as by the increments $\Delta U_a$ of the approximation. For better distinction, the area under the curve formed by the increments is hatched. The period, which in this example of the rectified sine curve extends from 0 to n, is subdivided into 32 steps. The increments occurring extend from 0 to 5, so that a storage space per address with 3 bits and a further bit for the sign, i.e., a total storage space of 4 bits per address is sufficient.

FIG. 2a shows at the same time the block diagram of a function generator according to the present invention for generating the function shown in this figure. The heart of this function generator is the storage matrix 1, in this case a PROM, in which, for each address, the corresponding increments $\Delta U_a$ are stored. Instead of a PROM, a RAM, a ROM or also a RePROM can, of course, be used as the storage matrix.

The output of the storage matrix 1 is connected to a bidirectional counter 3 via a parallel-to-series converter 2. A synchronous address counter 6 is driven by an oscillator 4 and a frequency divider 5 and, thereby, runs periodically through its counting range in steps. An address in the storage matrix 1 is assigned to each counter reading of the address counter 6. The oscillator 4 also drives the parallel-to-series converter 2, but in this special case with a frequency higher by the factor 8 than the address counter 6. This is necessary because at the output of the storage matrix 1, the storage data for each address are present as digital information at the same time, but must be converted by the parallel-to-digital converter 2 into time-sequential individual pulses for the bidirectional counter. The bidirectional counter 3 is an integrator which sums up the increments $\Delta U_a$ during every period, starting with 0. The instantaneous counter reading therefore corresponds to the digital absolute value of the function. This value is converted into an analog output variable $U_a$ via a digital-to-analog converter 7. The bidirectional counter 3 is furthermore reset to its starting value via a pulse member 8 driven by the last stage of the address counter 6.

In the present case, a storage matrix 1 with $2^n$ addresses of 4 bits each (m=4) is provided. 3 bits are designated for storing the increment values $U_a$ and 1 bit for the sign. Similarly, the address counter 6 must also have $2^n$ different counter positions. With the same resolution on the abscissa as on the ordinate, the bidirectional counter must have a counting range equal to that of the address counter. The conversion range of the digital-to-analog converter 7 must correspond to the counting range of the bidirectional counter 3. Because of the 3-bit storage content of the storage matrix 1, the frequency with which the parallel-to-series converter is driven, must be higher by a factor of at least $2^3 = 8$ than the frequency with which the address counter 6 is driven. By changing the frequency of the oscillator 4, the period of the curve generated can be varied without any further action on the function generator.

Figure 2B:
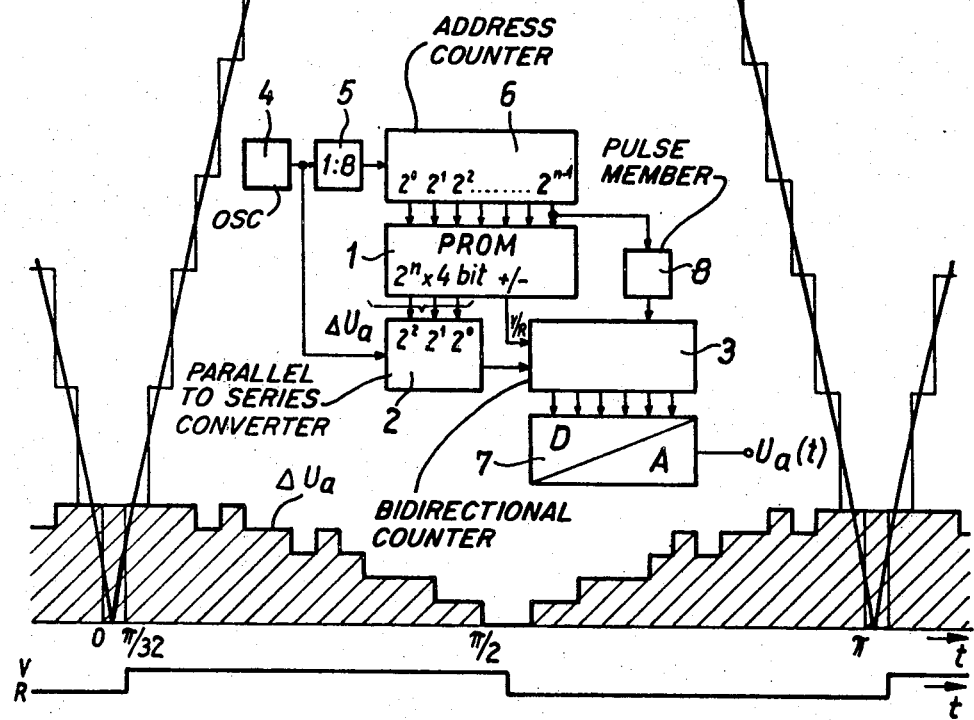

The sign which is stored in the storage matrix 1 for address determines the direction of counting of the bidirectional counter 3. In FIG. 2b, the counting direction is plotted versus time for the special example of the rectified sine wave.

FIG. 3a again shows a function generator, but this time for nonlinear mapping of electrical analog variables $U_e$. It is substantially the same function generator as in the previous FIG. 2 except that it is provided with an additional control member by which the integration is performed only to an address depending on the measurement variable $U_e$. Like elements are therefore again provided with the same reference symbol.

The control member consists of an AND gate 9 which is connected between the bidirectional counter 3 and the parallel-to-series converter 2. The output of a comparator 10 is connected to the second input of this AND gate 9. A third, inverted input of the AND gate 9 is coupled, via a frequency divider 12, to the last digit of the address counter 6. One input of the comparator 10 is at fixed potential. The other input is coupled, through an integrator 11, and selectably through two switches S1 and S2, respectively, to a voltage $U_e$ corresponding to the measurement variable or to a constant reference voltage $U_R$. The output of the frequency divider 12 is also used to actuate the switch S1 as well as an intermediate storage 14, i.e., a latch. The switch S2 is actuated by the signal coming from the comparator 10 output.

The operation of this circuit is as follows:

During a first sweep of the address counter 6, the voltage $U_e$ corresponding to the measurement variable is present at the input of the integrator 11 and charges the latter up to the end of the counter run. During this time, which is always the same, the AND gate 9 is cut off by the signal coming from the frequency divider 12, so that no pulses can get to the bidirectional counter 3, the integrator proper. During the following counter sweep, the switch position of the two switches S1 and S2 is such that the reference voltage source $U_R$ is connected to the integrator 11. The sign of this voltage is chosen opposite that of the measuring voltage $U_e$, so that the capacitor of the integrator 11 is discharged again. This continues until comparator 10 is balanced. At that instant, the switch S2 is operated and the integration ceases. From the beginning of this second run of the address counter 6 to the instant of balance of the comparator 10, the AND gate 9 conducts, so that during this time the stored data belonging to the respective addresses get to the bidirectional counter 3 as counting pulses, via the parallel-to-series converter 2, and are summed there. After every second sweep of the address counter 6, the output variable corresponding to the respective input variable $U_e$ is therefore present in digital form at the output of latch 14. It can be taken off in digital form or converted into an analog signal $U_1$ via a digital-to-analog converter. The control by which the integration limits are determined in this function generator, is similar to the dual-slope method, as is known in analog-to-digital converters ("Funkschau", 1974, no. 18, pages 711 and 712).

With a function generator of this kind, falling or rising curves can be reproduced nonlinearly within a quadrant. In the present case it is assumed that the input voltage corresponding to the measurement variable is $U_e \leq O$. Accordingly, the reference voltage was chosen $U_R > O$.

For a better understanding of the circuit according to FIG. 3a, the FIGS. 3b to 3g show the signal waveforms at different points within the circuit. FIG. 3b shows the output signal of the oscillator 4, which alternates between 0 and 1 with constant frequency. FIG. 3c shows the output signal $\phi 1$ of the frequency divider 5, which reduces the oscillator frequency in the ratio 1:8. With this frequency, the address counter 6 is driven. FIG. 3d shows the counter content of this address counter, which is equal to a corresponding address of the storage matrix 1. FIG. 3e shows the output A1 of the storage matrix 1, at which the signal stored for every address and its sign appear. In the present example, the signal of the first address shown is +5, that of the next address −3 and that of the address shown last, +1. FIG. 3f shows the corresponding pulse sequence $\phi 2$, which is fed to the bidirectional counter 3. Lastly, FIG. 3g shows the output signal A2 of the bidirectional counter 3 during the integration. It is clearly seen therefrom that, while the first address shown is being addressed, the counter counts 5 steps up, during the next address three steps down and during the last address, again one step up. The final value of the bidirectional counter 3 after this run then corresponds to the desired value of the function. FIG. 4a shows a somewhat different embodiment of the function generator such as was also shown already in principle in FIG. 3. Again, the same reference symbols were chosen for like switching elements.

Again, the input voltage $U_e$ is converted, according to dual-slope method, into a time which, referred to the total time of a sweep of the address counter, corresponds to the address belonging to this input voltage $U_e$. In FIG. 4c, the signal waveform I at the output of the integrator 11 is plotted for illustration. During a first sweep through the address counter 6, the input voltage $U_e$ is integrated. The slope of this straight line and the end value reached depend on the input voltage $U_e$. During a second sweep, the reference voltage $U_R$ of opposite polarity is integrated until the integrator has again reached the value zero. Since the reference voltage does not change, the slope of this line section is always the same, so that the time interval, until the integrator is returned to zero, depends on the starting value after the conclusion of the first sweep. During this time $t_e$, driven by the address counter 6, the addresses of the storage matrix are sensed sequentially, and their stored values are fed via the parallel-to-series converter 2 and the AND gate 9 to the bidirectional counter 3. Contrary to the embodiment of FIG. 3, the final value of the bidirectional counter 3 is not converted into the desired output signal via a digital-to-analog converter 7 at the end of this sweep. In the embodiment of FIG. 4, the AND gate 9 is part of a digital double-throw switch 13, through which it is achieved that during the one sweep, as described, the stored values get from the storage matrix 1 to the bidirectional counter, and during the other sweep, the output of the frequency divider 5 is directly connected to the input of the bidirectional counter 3. At the same time, a bistable multivibrator 17 together with an OR gate 15 insure that the counter is exclusively counted backward during this sweep of the counter. Multivibrator 17 is brought into the appropriate switch position at the beginning of this sweep via a pulse member 8. When the value zero is reached at the bidirectional counter 3, and overflow pulse ü switches the bistable multivibrator 17 into the other switching state, whereby no further pulses from the frequency divider 5 can reach the input of the bidirectional counter 3. As the bidirectional counter is counted down in individual steps at a rate which is given by the frequency of the oscillator 4, the time of this counting-down process corresponds exactly to the absolute value of the approximated function for the corresponding input voltage $U_e$. During the counting down of the bidirectional counter 3, a switch S3 is operated via the signal coming from the bistable multivibrator 17, whereby a constant voltage $U_k$ is fed to a filter 16, for instance, a lowpass filter. In this filter is practically formed the ratio of the time during which the switch S3 is closed, i.e., in which the bidirectional counter is counted down, to the total time T of an address counter sweep. Expressed differently, it can also be said that the digital-to-analog conversion such as was performed in the embodiment example according to FIG. 3, is replaced here by the formation of a ratio by means of the auxiliary voltage source and the filter 16. The output value of the filter 16 again corresponds to the absolute value $U_e$ of the approximated function at the point of the input voltage $U_e$.

For a better understanding of the operation of this circuit, the signal waveforms at different points within the circuit are again shown in FIGS. 4b to h. FIG. 4b shows the signal waveform designated as K at the output of the comparator 10, which can be either 0 or 1. FIG. 4c was already discussed. It should only be pointed out once more that T denotes the time of a complete sweep of the address counter 6, but $t_e$ a time proportional to the input voltage $U_e$. FIG. 4d shows the output signal A1 of the storage matrix 1, which again consists of the stored values, which belong to each address and denote the increments of the function to be reproduced, and of the sign of these stored values. FIG. 4e shows the pulse sequence $\phi 2$ which reaches the input of the bidirectional counter 3. This pulse sequence is easiest to understand if one starts in the center of the time axis. At this instant, the parallel-to-series converter 2 is connected through to the bidirectional counter 3. Let it be assumed that the value 2 is stored in the first address of the storage matrix 1; therefore, two pulses go to the bidirectional counter in the forward direction. For the next address, this process is repeated, and for the third address, the stored value is assumed to be +1; one pulse goes to the counter in the forward direction. Then, a stored value 0 without correponding pulse follows and two stored values with −1, whereby each time a pulse gets to the counter in the reverse direction. The final outcome resulting therefrom, in the bidirectional counter, is 3. During the remaining time of this sweep of the address counter, this value of the bidirectional counter is held without change. At the beginning of the following sweep, the bidirectional counter is counted backwards in steps equidistant in time until it has reached the value zero. In this case, three individual pulses appear. FIG. 4f shows the waveform, which determines whether the counter 3 is counted forward or backward.

FIG. 4g shows the waveform of the counter value. If one again starts in the center of the time interval shown, it is seen, according to the pulses shown in FIG. 4e and the counting direction shown underneath, how the respective counter value comes about. FIG. 4h, finally, shows the output signal Q of the multivibrator 17 and, therewith, the time during which the auxiliary voltage $U_k$ gets to the filter 16 via the switch S3. The ratio to the time during which Q is 1, to the total time of the measurement cycle is formed by the filter 16. Through the choice of the magnitude of the auxiliary voltage $U_k$, the output signal of the filter can be made to represent the desired value of the function.

In the embodiments according to FIGS. 3 and 4, the integration of the storage values was always performed by the bidirectional counter up to the address determined by the measurement variable. In the embodiment according to FIG. 3, this integration value was converted, via an intermediate storage, by a digital-to-analog converter into an analog signal which constitutes the value of the function. In the embodiment according to FIG. 4, the respective end value of the counter was first converted by counting the counter down in steps into a time and was subsequently converted into an analog signal by forming the ratio of this time to the total time of a complete measurement cycle. The digital-to-analog conversion was therefore replaced by forming the ratio of two times by the filter. In cases where it is sufficient that the storage matrix is organized with one or two bits per address, the integration can be performed directly by means of a filter by forming the ratio of the individual pulses coming from the storage matrix. Such an embodiment is shown in FIG. 5, in which again the same reference symbols were used for like switching elements as in the previous figures.

This embodiment according to FIG. 5 is likewise a function generator for the nonlinear mapping of electrical analog variables. In this embodiment, the storage matrix 1 is organized with $2^n$ addresses of locations with 2 bits. The individual addresses are sequentially accessed in equidistant time steps, by a synchronous address counter driven by an oscillator 4. The two outputs of the storage matrix 1 lead to two AND gates 9 and 21, the outputs of which drives two switches S3 and S4. Switches S3, S4, couple two auxiliary voltage sources of equal magnitude and opposite polarity selectably to the input of a filter 16. A comparator 10, to one input of which a voltage $U_e$ corresponding to the measurement variable is connected, and to the other input of which a reference voltage $U_R$ is connected through an integrator 11 serves as a control member. The output of the comparator is connected to one input of each of the AND gates 9 and 21. Via a pulse member 8 controlled by the last digit of the synchronous address counter 6 as well as a switch S5, the integrator 11 is reset to zero after each counter sweep. The integration of the increments, stored in the storage matrix 1, of the function to be reproduced continues until the comparator 10 is balanced.

Figure 5A:
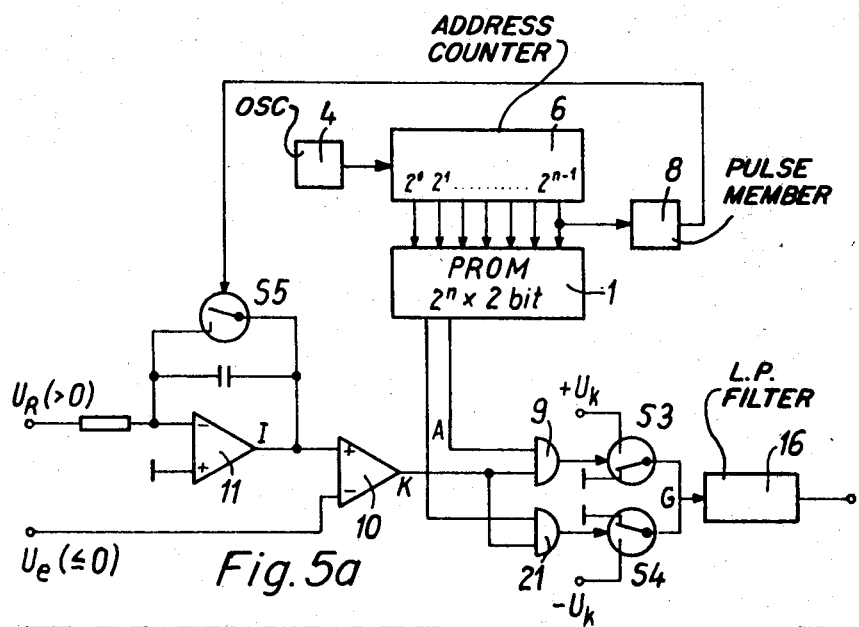
Figure 5B:
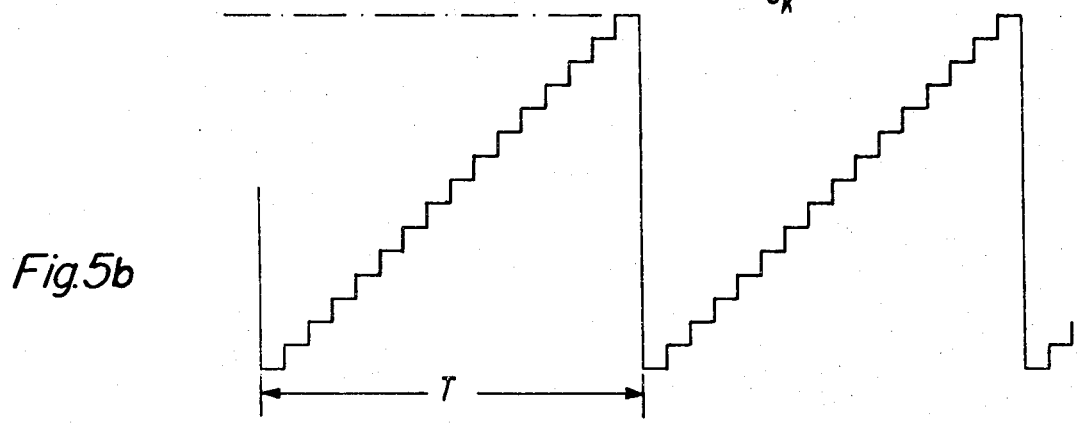
Figure 5C:

FIG. 5b shows the content, plotted versus time, of the address counter 6, which is increased in equidistant time steps by one each, starting from 0, up to the maximum value $2^n-1$. At any point in time, the counter content corresponds to an address in the storage matrix 1. Since with this function generator, falling and rising functions with not too steep a slope are to be reproduced, 0, 1 and −1 are sufficient for the synthesis. For storing in the storage matrix 1, these increments are coded such that the binary number 00 is assigned, for instance, to the increment 0, the binary number 01 to the increment 1 and the binary number 10 to the increment −1. The binary number 11 remains unused; it can also be assigned to the value 0. In FIG. 5c, the output signal A of the storage matrix 1 is shown in decoded form; it varies between −1 and +1.

Figure 5D:
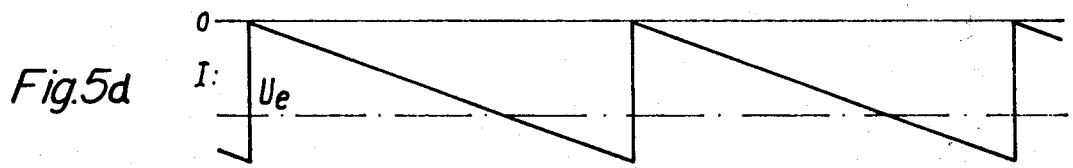

In FIG. 5d, the output signal I of the integrator 11 is shown as a straight line with negative slope. The intersection of this straight line with the dashed straight line running parallel to the time axis, which corresponds to the input voltage $U_e$, determins the instant when the comparator 10 is balanced. By this process, the input voltage $U_e$ is again converted into a time $t_e$, to which a given counter content and therefore, a defined address corresponds due to the given oscillator frequency.

Figure 5E:
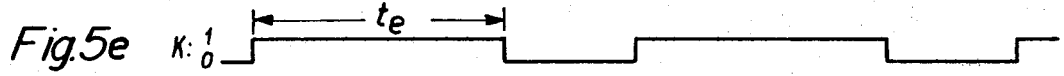
Figure 5F:
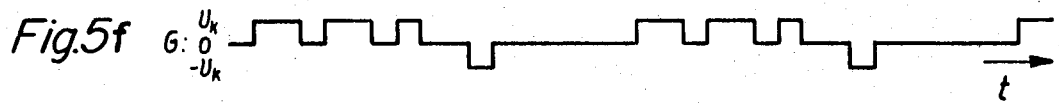
Figure 6A:
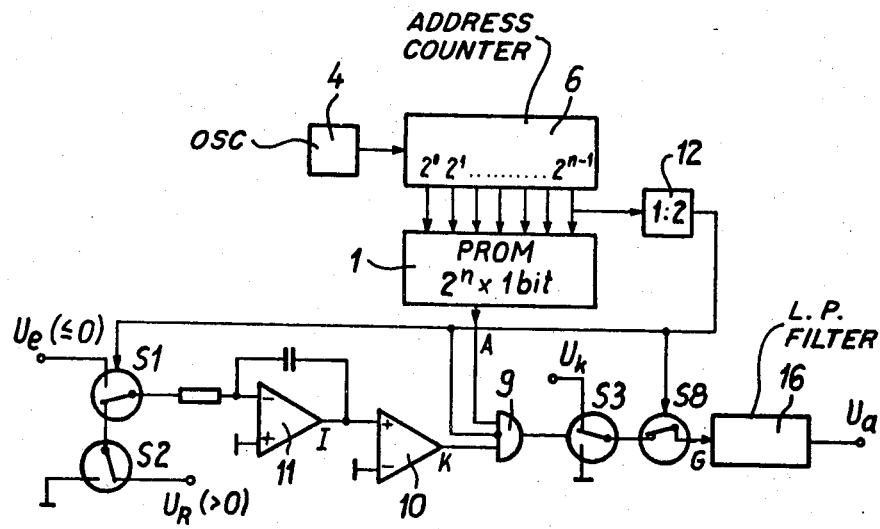
Figure 6B:
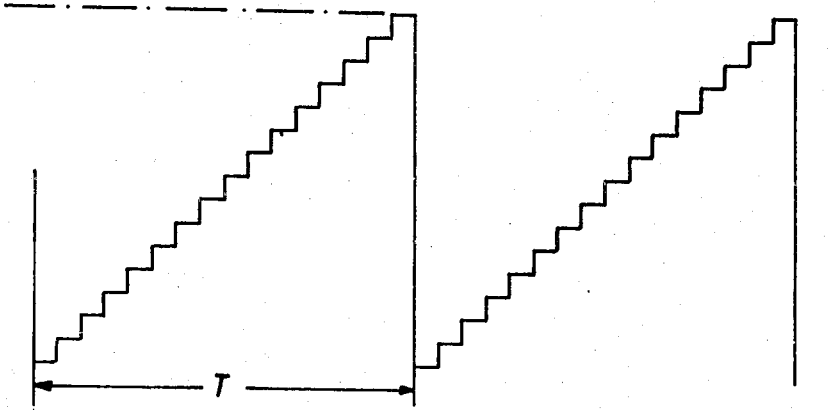
Figure 6C:
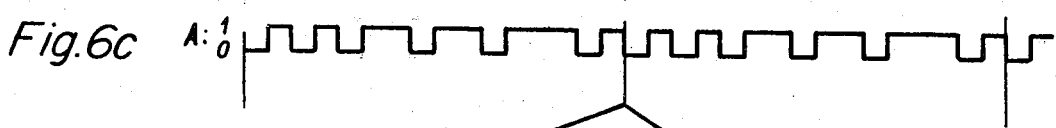
Figure 6D:
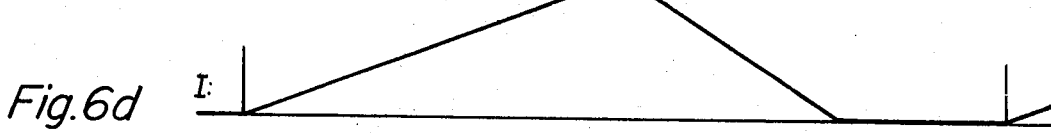
Figure 6E:
Figure 6F:
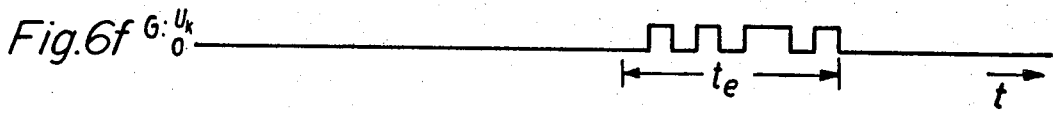

FIG. 5e shows the comparator output K which carries the signal 1 up to balance, and thereafter the signal 0. FIG. 5f, finally, shows the input signal G of the filter 16 which, for the time during which the comparator 10 is not balanced, corresponds to the decoded output signal A of the storage matrix 1, except for the factor of the auxiliary voltage $U_k$.

FIG. 6 shows a further embodiment of a function generator for the nonlinear imaging of electrical analog variables, which is suitable exclusively for monotonically rising or falling functions with not too steep a slope. This reduces the storage space requred still further. Only a storage matrix 1 with $2^n$ addresses at one bit each is required. The stored increment values can therefore assume only the values 0 or 1. Otherwise, this embodiment corresponds to that described in conjunction with the previous FIG. 5. Since no negative increment values can occur, a negative auxiliary voltage source is also not required; the AND gate 21 and the switch S4 can therefore be omitted. The control member consisting of the comparator, the integrator and the reference voltage corresponds to that already shown in FIGS. 3 and 4. As there, the input voltage $U_e$ is also converted here into a time by a method known in the analog-to-digital converter art as the dual-slope method. The integration of the storage matrix values is again performed via ratio-forming of the individual pulses, i.e., the ratio of the time in which the auxiliary voltage $U_k$ is present at the filter 16, to the total time of two full address counter sweeps is formed. Two address counter sweeps are necessary, as in the control method according to the dual-slope principle, the AND gate conducts only in every second sweep. By a further switch S8, which is connected between the switch S3 and the filter 16 and is driven, like the AND gate 9, via the frequency divider 12, the total time effective for the filter can be halved and thereby, the ratio or, correspondingly, the output voltage, can be doubled.

FIG. 6b again shows the monotonically rising counter content, and FIGS. 6c to 6f, further voltage waveforms occurring within the circuit at points marked with capital letters A, I, K and G.

Figure 7A:
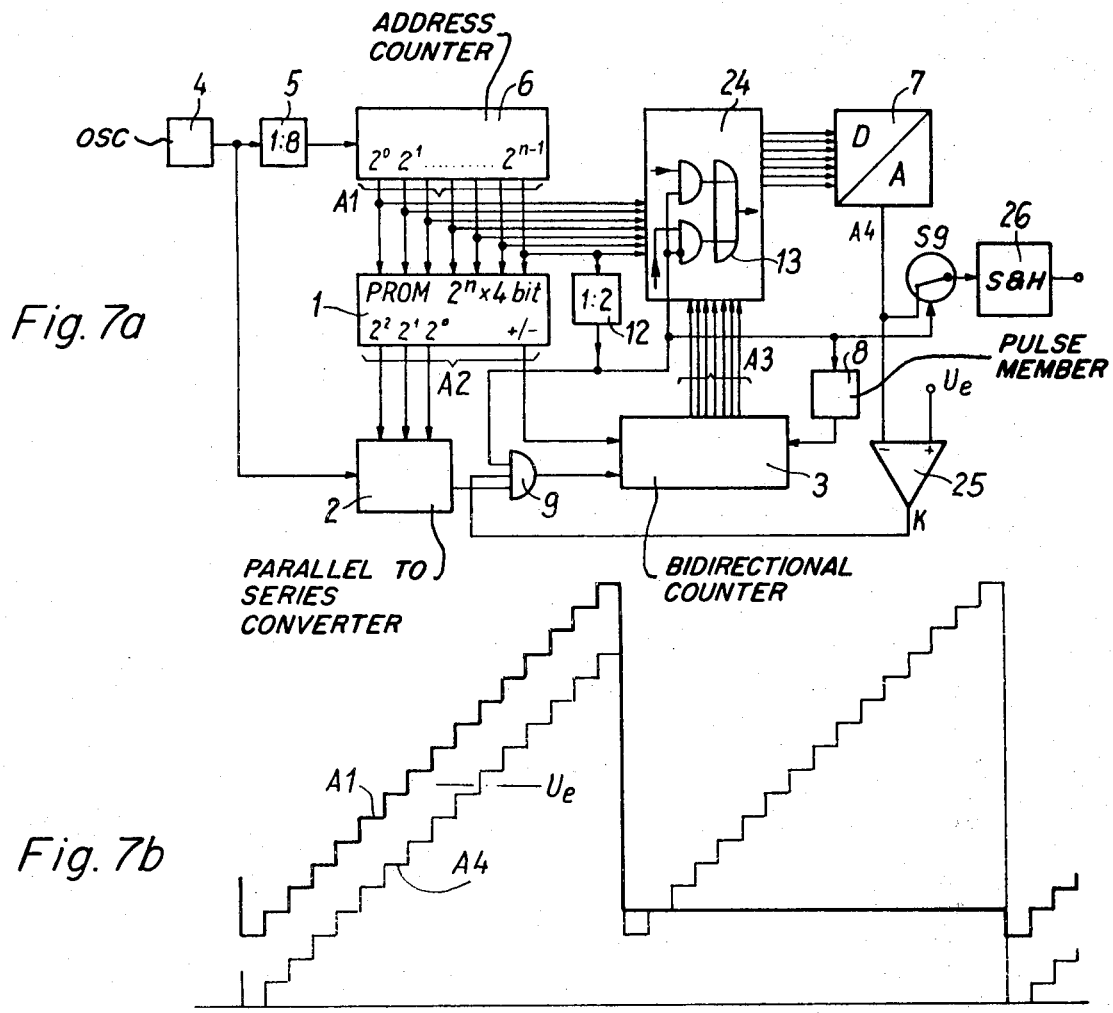

In the embodiments for the nonlinear imaging of an electrical analog variable discussed so far, the variable was concerted, either by the single-slope or the dual-slope method, into a time with which a given address was associated. The embodiment according to FIG. 7 shows a different implementation; this involves a function generator with a staircase converter. In this case, a $2^n \times 4$ bit-organized PROM serves as the storage matrix 1. Except for the control member, this embodiment corresponds substantially to that discussed in connection with FIG. 3. In contrast thereto, a switching member 24 consisting of n digital double-throw switches is provided here the one input family of which is connected to the n outputs of the address counter 6 and the other input family of which is connected to the n outputs of the bidirectional counter 3, and the n outputs of which are fed to the digital-to-analog converter 7. The output of the digital-to-analog converter 7 leads to a comparator 25, to the other input of which the input voltage $U_e$ is connected. The output of the comparator 25 is connected to one input of the AND gate 9. The second input of this AND gate is connected to the input of the parallel-to-series converter 2, and the third input, via a frequency-halving circuit 12, to the last digit of the address counter 6. Furthermore, the output of the digital-to-analog converter is connected to an output terminal via a switch S9 and a sample and hold circuit 26.

The operation of this function generator is the following:

During a first sweep of the address counter 6, the outputs of this counter are connected via the switching member 24 to the digital-to-analog converter 7, so that an analog output voltage corresponds to the instantaneous counter reading. This output voltage is compared in the comparator 25 with the input voltage $U_e$. At balance, the AND gate 9 cuts off. Up to that time, the stored values belonging to the individual addresses are fed, during this sweep, as counting pulses to the bidirectional counter 3 via the parallel-to-series converter 2 and are summed there. If the comparator 25 is at balance, the counter content of the bidirectional counter 3 therefore corresponds to the desired digital value of the function. In the sweep of the address counter 6 following thereon, the output of the bidirectional counter 3 is now connected via the switching member 24 to the digital-to-analog converter, and at the same time, the switch S9 is closed. The output of the digital-to-analog converter therefore furnishes the analog value of the function for the corresponding measurement variable. This value is fed to the sample and hold 26 and via the latter to the output. At the end of the second sweep, the bidirectional counter 3 is reset to zero by a pulse member 8.

Figure 7B:
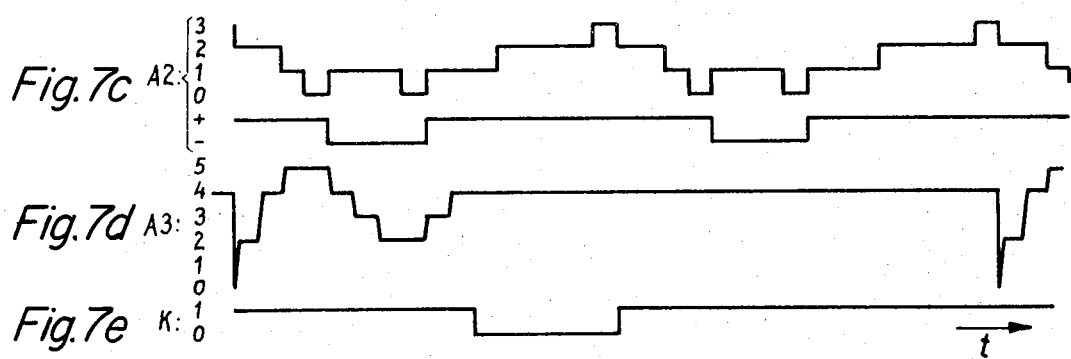

FIG. 7b shows, somewhat offset from each other, the staircase-like waveform A1 of the counter content of the address counter 6, and the corresponding output signal A4 of the digital-to-analog converter 7. In this curve the magnitude of the input voltage $U_e$ is represented by a horizontal line; the intersection of this line with curve A4 corresponds to comparator balance. FIG. 7c shows the magnitude and the sign of the starting value A2 of the storage matrix 1 versus time, which is equivalent to showing it versus address. FIG. 7d shows the counter reading of the bidirectional counter 3 resulting therefrom. FIG. 7e, finally, shows the comparator output K. In this embodiment, the circuit was shown so that during a first sweep of the address counter 6, the value of the function is read into the bidirectional counter 3, which again constitutes the integrator, and that this integration value is read out during a subsequent second sweep of the address counter 6. Since, however, the reading out can take place in a very short time, the circuit can also be modified in that at the end of each sweep of the address counter 6, the switching member 24 switches over only for a brief moment in order to read out the counter content of the bidirectional counter 3 via the digital-to-analog converter 7.

FIG. 8 shows an extension of a function generator according to the present invention, by means of which it is possible to determine the inverse function for monotonically rising or monotonically falling functions. Like switching elements are again provided with the same reference symbols. A $2^n \times 2$ bit-organized PROM serves as the storage matrix 1, the output of which is connected to the digital-to-analog converter 7. This digital-to-analog converter 7 consists of three parallel resistors, two of which have the resistance R and the third, the resistance R/2. Further provided are two switches S10 and S11, which are addressed by the output of the storage matrix 1. The constant reference voltage $U_R$ is applied to the input side of the resistance network of the digital-to-analog converter 7. The output of the digitalto-analog converter 7, i.e., the summing point of the resistance network, is connected to an integrator 27, which is reset to zero at the end of every address counter sweep by means of a switch S5 driven via the pulse member 8. The output of the integrator 27 is connected to one input of a comparator 28, to the other input of which an input voltage $U_e$ corresponding to the measurement variable is connected. The comparator 28 controls a switch S12, through which a voltage source $U_k$ is connected to a lowpass filter 29.

The operation of this function generator is as follows:

At the output of the integrator 27, a voltage the value of which is proportional to the absolute value of the function, the increments of which are stored in the storage matrix 1 is formed periodically in time. As a monotonic function was assumed, this output voltage likewise changes monotonically. In the comparator 28, this output voltage is compared with an input voltage $U_e$. From the start of such a counter sweep to balance, a time is therefore determined which depends on the function. In the following filter 29, this time is put in relation to the total time of a period, i.e., an address counter sweep. The output signal $U_a$ is therefore linked with the input signal $U_e$ via the inverse function. The advantages of the circuit are essentially the simple switching elements required for its realization and, in addition, the fact that the filter 29 is presented with a constant voltage during the entire time up to balance, i.e., with only one pulse of different length per period. Rounding of the flanks of this pulse is therefore hardly noticed as a disturbance. An example of an application of this function generator is the linearizing of thermo voltage curves. If an address is assigned to the temperature in steps and if the differences of the thermo voltage occurring are stored in the storage matrix 1, and if subsequently the thermo voltage obtained in a measurement, optionally after pre-amplification, is fed to the function generator as the input voltage $U_e$, then an output voltage $U_a$ is obtained which is directly proportional to the temperature.

FIG. 8b again shows the output value, plotted versus time, of the storage matrix 1, which in this case can vary between 0 and 3.

FIG. 8c shows the output voltage $U_I$ of the integrator 27 under the assumption that the stored value 0 corresponds to tan $\alpha = -0.5$, the stored value 1 to tan $\alpha = -1$, the stored value 2 to tan $\alpha = -1.5$ and the stored value 3 to tan $\alpha = -2$. In addition, the voltage value $U_e$ is drawn parallel to the time axis on the abscissa. At the intersection of the two curves, the comparator 28 is at balance. The output signal K of the comparator 28 is shown in FIG. 8d.

In all embodiments, in which the output signal is determined by forming a ratio, either connecting an auxiliary voltage source $U_k$ to a filter or not, the output signal can also be varied by varying the magnitude of the auxiliary voltage. In this manner, multiplication or a modulation of two voltages can be performed in a practical manner.

What is claimed is:

1. A function generator for an arbitrarily specifiable function comprising:
   (a) an oscillator;
   (b) an address counter having its input coupled to the output of said oscillator;
   (c) a storage matrix with $2^n$ address locations each capable of storing m bits the number m of said bits being determined by the maximum change in value of the function between two adjacent addresses, the data stored at each address being only the change in value from the previous adjacent address, said storage matrix receiving its address input from said counter;
   (d) a bidirectional counter;
   (e) means to drive said bidirectional counter with a frequency higher by a factor of $2^{m-1}$ than the frequency driving the address counter;
   (f) a digital to analog converter receiving its input from said bidirectional counter and providing the function generator output in analog form; and
   (g) a control member, having as an input an external measurement variable for coupling the stored values in said storage matrix sequentially to said integrating means only up to an address dependent on said external measurement coupled so as to control the input to said integrating means.

2. The function generator according to claim 1, wherein said control member comprises:
   (a) an AND gate for coupling the successive outputs of said storage matrix into said bidirectional counter, said AND gate having an enabling input;
   (b) a comparator providing its output as the enabling input to said AND gate, said comparator having as one input a voltage corresponding to said external measurement variable; and
   (c) an integrator having as an input a constant reference voltage and providing its output as a second input to said comparator.

3. The function generator according to claim 1, wherein said control member comprises:
   (a) means to develop a pulse train with a frequency which is one-half the frequency at which said address counter is swept;
   (b) an AND gate having said pulse train as one input and the output of said storage matrix as a second input and providing its output to said bidirectional counter;
   (c) a comparator having one input coupled to ground providing its output to said AND gate;
   (d) an integrator having its output coupled as the second input of said comparator; and
   (e) means responsive to said pulse train for alternately coupling to the input of said integrator a voltage corresponding to said external measurement value and a fixed reference voltage.

4. The function generator according to claim 1, wherein said control member comprises:
   (a) a comparator having as one input a voltage corresponding to said external measurement variable and as a second input the output of said digital to analog converter;
   (b) a network of n digital double throw switches having their outputs coupled as the inputs to said digital to analog converter, one input of each of said switches being connected to one of the n outputs of said address counter and the other input of each of said switches being coupled to one of the n outputs of said bidirectional counter;
   (c) a parallel to serial converter for converting the outputs of said storage matrix into a serial pulse train;
   (d) a frequency halving circuit having its input coupled to the last stage of said address counter;
   (e) an AND gate having as inputs the output of said frequency halving circuit, the output of said parallel to series converter and the output of said comparator, and providing its output to said bidirectional counter;

(f) a sample and hold circuit; and (g) a switch responsive to the output of said frequency-halving circuit for coupling the output of said digital to analog converter to said sample and hold circuit, the output of said sample and hold circuit being the function generator output.

5. A function generator for an arbitrarily specifiable function comprising:

(a) an oscillator;

(b) an address counter having its input coupled to the output of said oscillator;

(c) a storage matrix with $2^n$ address locations each capable of storing m bits the number m of said bits being determined by the maximum change in value of the function between two adjacent addresses, the data stored at each address being only the change in value from the previous adjacent address said storage matrix receiving its address input from said counter;

(d) means for integrating the data output from said storage matrix as said counter addresses each of said locations in sequence and for converting the final output of said function generator into an analog voltage; and (e) a control member, having as an input an external measurement variable for coupling the stored values in said storage matrix sequentially to said integrating means only up to an address dependent on said external measurement coupled so as to control the input to said integrating means.

6. The function generator according to claim 5, wherein said means for integrating and converting comprise:

(a) a low pass filter;

(b) a switch coupling a predetermined voltage source to said low pass filter; and (c) means for controlling said switch having as inputs the output of said storage matrix and the output of said control member.

7. The function generator according to claim 5, wherein said control member comprises:

(a) an AND gate for coupling the successive outputs of said storage matrix into said means for integrating and converting, said AND gate having an enabling input;

(b) a comparator providing its output as the enabling input to said AND gate, said comparator having as one input a voltage corresponding to said external measurement variable; and (c) an integrator having as an input a constant reference voltage and providing its output as a second input to said comparator.

8. The function generator according to claim 5, wherein said control member comprises:

(a) means to develop a pulse train with a frequency which is one-half the frequency at which said address counter is swept;

(b) an AND gate having said pulse train as one input and the output of said storage matrix as a second input and providing its output to said means for integrating and converting;

(c) a comparator having one input coupled to ground providing its output to said AND gate;

(d) an integrator having its output coupled as the second input of said comparator; and (e) means responsive to said pulse train for alternately coupling to the input of said integrator a voltage corresponding to said external measurement value and a fixed reference voltage.

9. A function generator for an arbitrarily specifiable function comprising:

(a) an oscillator;

(b) an address counter having its input coupled to the output of said oscillator;

(c) a storage matrix with $2^n$ address locations each capable of storing m bits the number m of said bits being determined by the maximum change in value of the function between two adjacent addresses, the data stored at each address being only the change in value from the previous adjacent address, said storage matrix receiving its address input from said counter;

(d) a digital to analog converter having as inputs the output of said storage matrix;

(e) an analog integrator receiving as inputs the output of said digital to analog converter;

(f) a comparator having as one input the output of said integrator and as another input a voltage corresponding to said external measurement variable;

(g) a low pass filter and a switch coupling a known voltage source to the input of said low pass filter, said switch coupled to be controlled by the output of said comparator.

* * * * *